US008694827B2

(12) United States Patent
Bower, III et al.

(10) Patent No.: US 8,694,827 B2
(45) Date of Patent: Apr. 8, 2014

(54) JOB MIGRATION IN RESPONSE TO LOSS OR DEGRADATION OF A SEMI-REDUNDANT COMPONENT

(75) Inventors: Fred A. Bower, III, Durham, NC (US); Scott A. Piper, Bothell, WA (US); Gregory B. Pruett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/541,403

(22) Filed: Jul. 3, 2012

(65) Prior Publication Data

US 2012/0290874 A1 Nov. 15, 2012

Related U.S. Application Data

(63) Continuation of application No. 12/886,299, filed on Sep. 20, 2010.

(51) Int. Cl.
*G06F 11/00* (2006.01)

(52) U.S. Cl.
USPC .............. 714/13; 714/4.11; 714/15; 709/223; 709/218; 709/227; 709/203; 709/221; 719/318; 370/216

(58) Field of Classification Search
USPC .......... 709/223, 318, 227, 203, 221; 370/216; 719/338; 714/4.11
See application file for complete search history.

(56) References Cited

U.S. PATENT DOCUMENTS

| 3,771,146 | A | * | 11/1973 | Cotton et al. | 710/260 |
|---|---|---|---|---|---|
| 4,051,461 | A | * | 9/1977 | Hashimoto et al. | 711/118 |
| 4,371,754 | A | * | 2/1983 | De et al. | 714/10 |
| 4,608,688 | A | | 8/1986 | Hansen et al. | |
| 4,675,538 | A | * | 6/1987 | Epstein | 307/64 |
| 6,199,179 | B1 | | 3/2001 | Kauffman et al. | |
| 7,467,324 | B1 | | 12/2008 | Davda et al. | |
| 7,530,000 | B2 | | 5/2009 | Fairhurst et al. | |
| 7,543,182 | B2 | | 6/2009 | Branda et al. | |
| 7,711,980 | B1 | | 5/2010 | Scarpello, Jr. et al. | |
| 7,730,365 | B1 | | 6/2010 | Belady et al. | |
| 2003/0018927 | A1 | * | 1/2003 | Gadir et al. | 714/4 |
| 2004/0153708 | A1 | * | 8/2004 | Joshi et al. | 714/4 |
| 2006/0015773 | A1 | * | 1/2006 | Singh et al. | 714/13 |
| 2008/0030764 | A1 | * | 2/2008 | Zhu et al. | 358/1.15 |
| 2008/0157601 | A1 | * | 7/2008 | Masciarelli et al. | 307/66 |

* cited by examiner

*Primary Examiner* — Joshua P Lottich
*Assistant Examiner* — Jeison C Arcos
(74) *Attorney, Agent, or Firm* — Katherine S. Brown; Jeffrey L. Streets

(57) ABSTRACT

A method of managing the workload in a computer system having one or more semi-redundant hardware components is provided. The method comprises detecting loss or degradation of the level of performance of one or more of the semi-redundant hardware components, identifying hardware components affected by the loss or degradation, migrating a critical job from an affected hardware component to an unaffected hardware component, and performing less-critical jobs on an affected hardware component. Loss or degradation of the semi-redundant component reduces the capacity of affected hardware components in the computer system without entirely disabling the computer system. Jobs identified as critical run on hardware components having the most capacity and reliability, while less-critical jobs use the remaining capacity of affected hardware components. Examples of semi-redundant hardware components include a memory module, CPU core, Ethernet port, power supply, fan, disk drive, and an input output port.

14 Claims, 3 Drawing Sheets

JOB MIGRATION IN RESPONSE TO LOSS OR DEGRADATION OF A SEMI-REDUNDANT COMPONENT

CROSS-REFERENCE TO RELATED APPLICATIONS

This application is a continuation of U.S. patent application Ser. No. 12/886,299 filed on Sep. 20, 2010.

BACKGROUND

1. Field of the Invention

The present invention relates to workload management in a computer system.

2. Background of the Related Art

Computer systems include various hardware components that interact to perform jobs or tasks. For example, a typical computer system will include a central processing unit, memory, input output controller, data storage device, power supply, fan and other hardware components. Because it is common that the demand for performing jobs will exceed the maximum capacity of a single computer, it is desirable to design computer systems that are scalable. A computer system is scalable if multiple units of hardware components can be implemented together to accomplish greater performance. A high degree of scalability is provided by commercial blade server systems.

Redundant hardware components are provided in many computer systems to increase reliability of operation. If one hardware component fails, another similar or identical hardware component is then available to compensate for the failed hardware component. A simple system may, for example, provide "N+N" redundancy, where a number (N) of computer systems are each provided with a number (N) of primary hardware components and a number (N) of redundant hardware components. Other systems may have "N+1" redundancy, where N computer systems each have a primary hardware component and there is one redundant hardware component available to ensure full operation of the N computer system when one of the N primary hardware components fails. While there are various ways to implement redundant hardware components in a computer system, the typical objective is to increase reliability and avoid any interruption in the performance of the computer system.

BRIEF SUMMARY

One embodiment of the present invention provides a method comprising detecting loss or degradation of the level of operation of one or more semi-redundant hardware components, identifying hardware components that are affected by the loss or degradation of the one or more semi-redundant components, migrating a critical job from an affected hardware component to an unaffected hardware component, and performing less-critical jobs on an affected hardware component.

DETAILED DESCRIPTION

Figure 1:
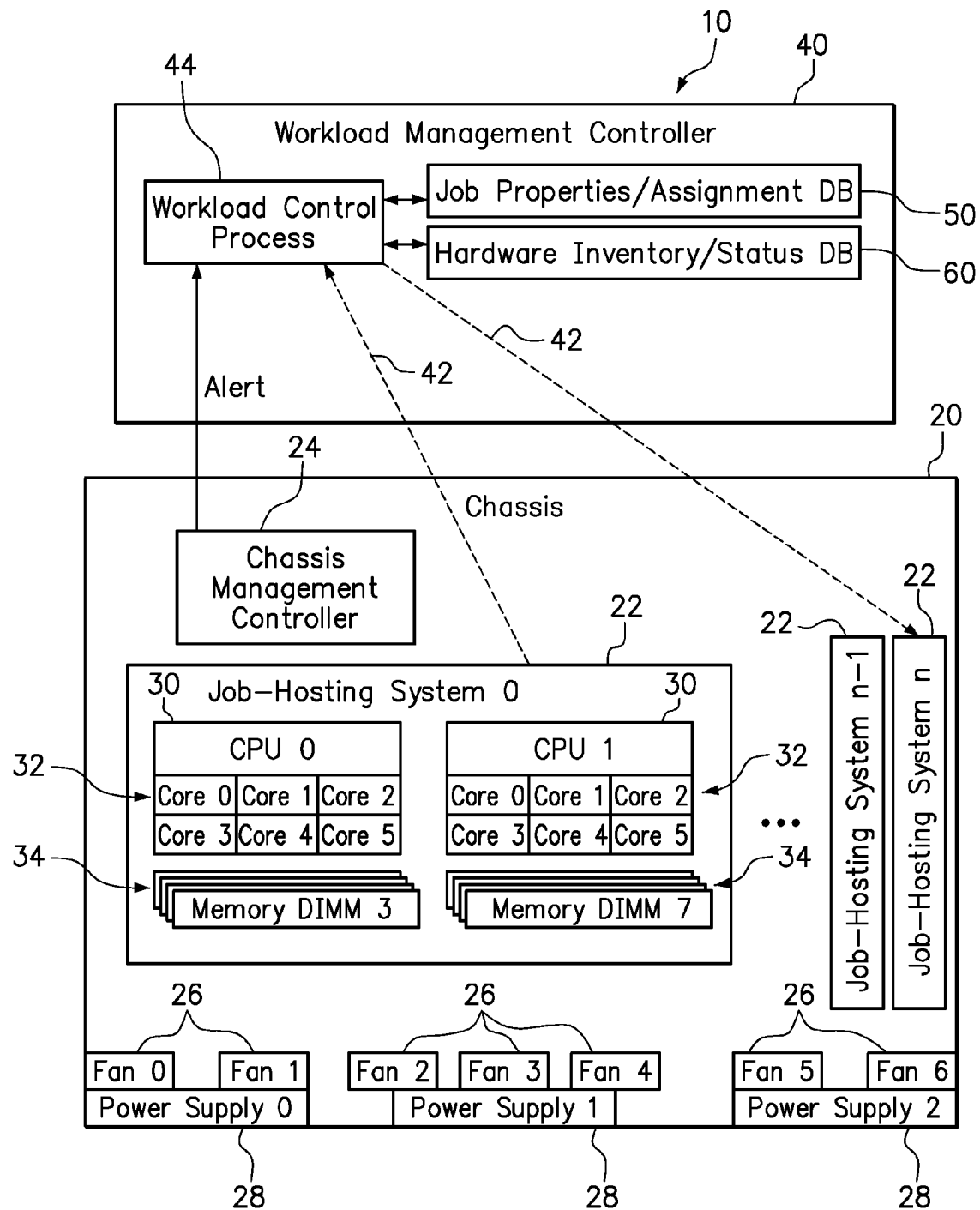
FIG. 1 is a diagram of one embodiment of a computer system including various semi-redundant hardware components.

One embodiment of the present invention provides a method of managing the workload in a computer system having one or more semi-redundant hardware components. The method comprises detecting loss or degradation of the level of performance of one or more of the semi-redundant hardware components, identifying hardware components that are affected by the loss or degradation of the one or more semi-redundant components, migrating a critical job from an affected hardware component to an unaffected hardware component, and performing less-critical jobs on an affected hardware component. Loss or degradation of the semi-redundant component reduces the capacity of affected hardware components in the computer system without entirely disabling the computer system.

In another embodiment of the method, a workload management controller may detect loss of a semi-redundant hardware component by receiving an alert from a chassis management controller in a computer system that includes the lost or failed semi-redundant hardware component. Optionally, the workload management controller may be external or internal to the chassis, and may be separate from or integrated with another controller, such as the chassis management controller or another supervisory controller.

In yet another embodiment of the method, the semi-redundant hardware component is selected from a memory module, CPU core, Ethernet port, power supply, fan, disk drive, and an input output port. For example, the semi-redundant hardware component may be a power supply tied into a power bus with one or more other power supplies, wherein the power bus provides power to the computer system. While loss of a power supply on the power bus will reduce the capacity of the computer system, it is not necessary for the entire computer system to be shut down.

In a further embodiment of the method, a specific semi-redundant hardware component may be deconfigured from systems or components that utilize the specific semi-redundant hardware component in response to detecting loss of the specific semi-redundant hardware component. Deconfiguring a lost or failed hardware component means that other hardware or software components will no longer have the ability to communicate with the component and may, if able, take steps to access other resources.

In yet another embodiment of the method, a user-provided tag is stored in association with a job, wherein the tag may be set to identify the job as critical or not critical. The user-provided tag may, for example, be stored in a database accessible to a workload management controller. In a further option, the user-provided tag may express the criticality of a job as a scaled number or score rather than a binary indication of critical or not critical. As an alternative to a user-provided tag, or for use when the user has not provided a tag, the method may identify a job as being critical in response to determining that the job is currently using greater than a set point percentage of resources allocated to the job. Similarly, the criticality of a job may be a scaled number or score that is proportional to a job's use of resources as a percentage of the resources allocated to that job.

In a still further embodiment of the method, a job list that identifies critical jobs may be maintained. Accordingly, the job list may be obtained by simply reading the job list, which may be maintained by a workload management controller.

Furthermore, the step of migrating a critical job may include selecting the critical job from the job list. In an alternative embodiment of the method, a list of the jobs running on affected hardware components may be obtained as needed for the purpose of identifying a critical job to migrate. For example, a job list may be obtained by querying the affected hardware components.

In another embodiment of the method, hardware components that are affected by the loss or degradation of the one or more semi-redundant components are identified by querying a plurality of hardware components within a common system with the one or more semi-redundant components that has been lost or degraded. Alternatively, affected hardware components may be identified by reading an inventory of hardware components within a common system with the one or more lost or degraded components.

In a further embodiment of the method, a less-critical job is migrated from an unaffected semi-redundant hardware component to the affected hardware component so that the less-critical job may be performed on the affected hardware component. This embodiment takes greatest advantage of the affected hardware component by utilizing the performance capacity, albeit reduced or degraded, to perform jobs.

One embodiment of the invention also provides a computer program product including computer usable program code embodied on a computer usable storage medium for performing any of the foregoing embodiments of the method. For example, the computer program product of one embodiment comprises computer usable program code for detecting loss or degradation (a fault) of the level of operation of one or more of the semi-redundant hardware components, computer usable program code for identifying hardware components that are affected by the loss or degradation of the one or more semi-redundant components, computer usable program code for migrating a critical job from an affected hardware component to an unaffected hardware component, and computer usable program code for performing less-critical jobs on affected hardware components.

FIG. 1 is a diagram of one embodiment of a computer system 10 including various semi-redundant hardware components. A chassis 20 includes a plurality of job-hosting systems 22 (labeled System 0 through System n), a chassis and/or system management controller 24, a plurality of fans 26 (labeled Fan 0 through Fan 6), and a plurality of power supplies 28 (labeled Power Supply 0 through Power Supply 2). Each of the job hosting systems 22 (System 0 through System n) include two CPUs 30 (labeled CPU 0 and CPU 1), each CPU including multiple cores 32 (labeled Core 0 through Core 5) and having direct access to memory 34 (CPU 0 having access to dual in-line memory module (DIMM) 0 through DIMM 3, and CPU 1 having access to DIMM 4 through DIMM 7).

Many of the hardware components in the chassis 20 may be considered to be "semi-redundant." The term "semi-redundant" describes components that can suffer a failure or loss of performance, yet do not prevent the entire system from doing some useful work, though the system's performance is typically not at the same level of performance/capability as it was at prior to the failure or loss. The semi-redundant hardware components in chassis 20 include the multiple CPU cores 32 within each CPU 30, the memory modules 34 associated with each CPU 30, the fans 26, and the power supplies 28. In a non-limiting example, the loss of one memory module 34 (i.e., DIMM 3 fails, but DIMMs 0 through 2 are still operable) associated with CPU 0 will reduce the system memory available, but the system can still run on the reduced amount of memory that is available.

Embodiments of the invention may address a "localized loss" and/or a "non-localized loss" of a semi-redundant hardware component. A "localized loss" has a specific zone of effect, whereas a "non-localized loss" refers to losses that do not have a specific zone of effect. For example, the loss of a CPU core is a localized loss as shown in FIG. 1, because the loss will have a specific zone of effect on the CPU 30 in which it operates. By contrast, the loss of a power supply 28 is a non-localized loss in the system 10 shown in FIG. 1, because all of the power supplies 28 (Power Supply 0 through Power Supply 2) feed into a common power pool to supply power for all the other hardware components. That is, each power supply is tied into a power bus rather than having a dedicated connection to a single system. Therefore, the loss of a power supply 28 will reduce the capacity of the system overall, but the effect of the power loss is not directed to any specific portion of the hardware components. As a result, the loss of a semi-redundant power supply can be compensated for by imposing a power limit on one or more of the attached systems 22, so all of the jobs can be preserved in a possibly degraded operational state. This allows the workload management controller 40 to make migration policy decisions rather than having to recover jobs from machines that would be shut down if a dedicated power supply were lost (i.e. if the power supply were non-redundant, rather than semi-redundant).

The power supplies 28 (as well as fans and management elements) are semi-redundant due to the chassis-level hardware design, and may be shared by each of the independent job-hosting systems 22. However, each independent job-hosting system 22 may also have semi-redundant hardware components that can not be shared with other job-hosting systems 22 due to the more complete physical separation between systems. For example, the DIMMs, CPU cores and CPUs may be semi-redundant with respect to an individual job-hosting system because of the local replication of the components, yet these same components are not shared with other job-hosting systems. The scope of the present invention covers the loss of semi-redundant components at any level of the hardware design, specifically including the chassis-level configuration and the independent system-level configuration.

When there is a loss of a semi-redundant component, an alert signal 25 may be generated by the chassis and/or system management controller 24 and sent to the workload management controller 40. In accordance with the various embodiments of the invention, critical jobs may be migrated from affected hardware to non-affected hardware (see dashed lines 42 illustrating job migration from System 0 to System n) in response to detecting loss of a semi-redundant hardware component. The advantage of this migration is that applications or jobs tagged as critical are run on the most capable hardware.

A workload control process 44 is run by the workload management controller 40 to determine and control appropriate migration of jobs. The workload control process 44 has access to and reads data from a job properties/assignment database 50 and a hardware inventory/status database 60. A further discussion of the workload control process 44 and the databases 50, 60 is provided below with reference to FIG. 2.

Figure 2:
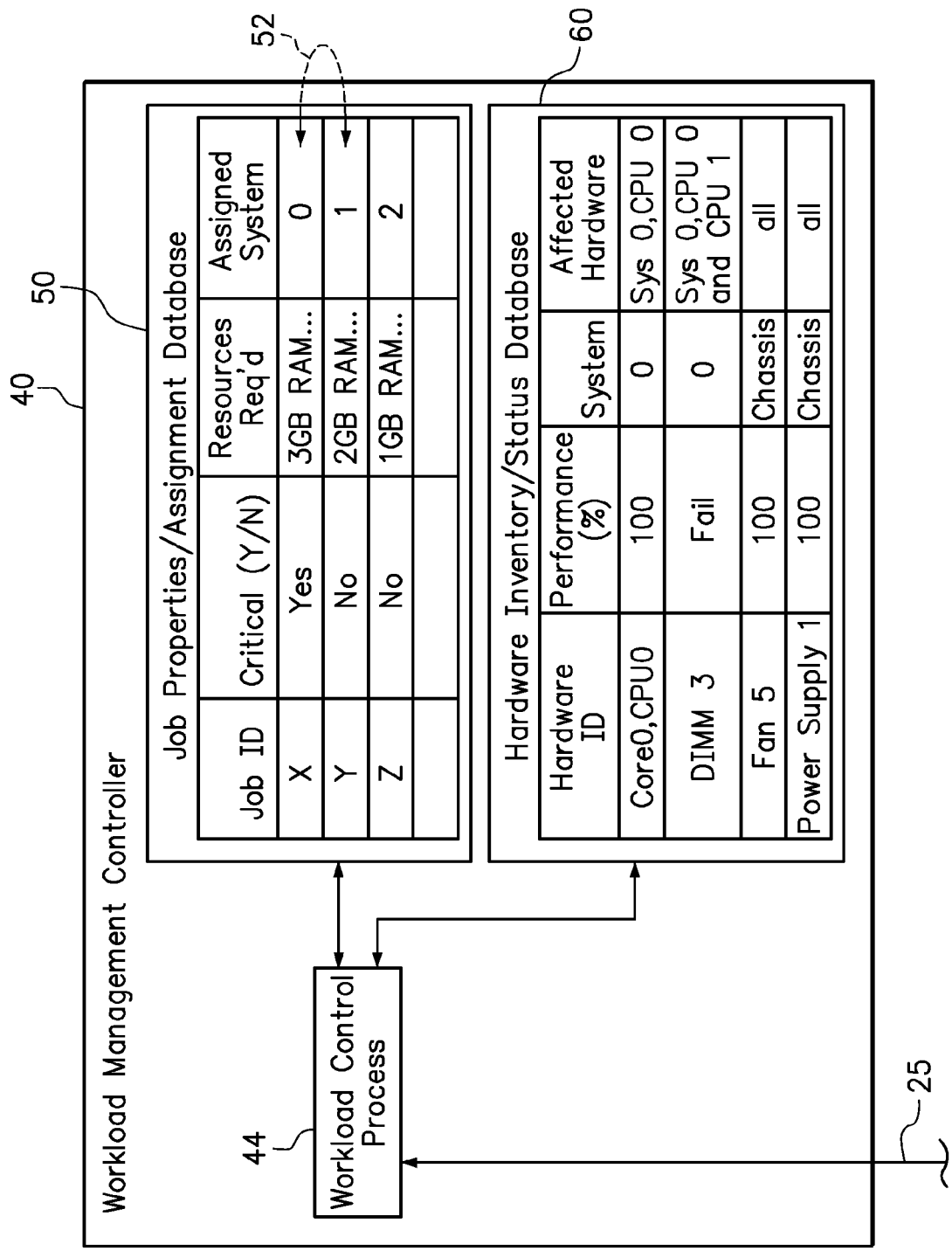
FIG. 2 is a diagram of one embodiment of a workload management controller as might be used in the computer system of FIG. 1.

FIG. 2 is a diagram of one embodiment of the workload management controller 40 as might be used in the computer system 10 of FIG. 1. When a semi-redundant component experiences a fault, failure, or degradation of performance (i.e., a loss of performance), the chassis management controller or other error management system may de-configure the component from the system(s) utilizing it. The system management controller or chassis management controller (SMC/

CMC) notes the fault, and emits an alert 25 to the workload management controller 40 (WMC).

Having received the alert 25 identifying the hardware component that has suffered a loss of performance, the WMC 40 identifies which hardware components are affected by the loss. Specifically, to identify affected hardware, the WMC 40 may utilize information in the hardware inventory/status database 60 or query the SMC/CMC 24 during event processing. Accordingly, the hardware inventory/status database 60 is a non-limiting example of the data that may be obtained for use by the workload control process 44. It should be recognized that the data may be obtained from various sources and/or databases at different times and it is not necessary that the data be arranged in a single database or in the arrangement shown.

However, in the embodiment of FIG. 2, the hardware inventory/status database 60 maintains a separate record for each hardware component in the system. The record for each individual component includes a separate field for a hardware identification, performance status, system location, and hardware that is affected by performance of the individual hardware component. As shown, the Core 0 of CPU 0 has a localized effect on CPU 0 of System 0. By contrast, DIMM 3 (also associated with CPU 0) has an effect that is local as to System 0, but not CPU-local. In particular, the loss of DIMM 3 is expected to have an effect on both CPU 0 and CPU 1, through the impact will be greater on CPU 0. Fan 5 and Power Supply 1 both have a non-localized effect on each of the job hosting systems 32 of the chassis 20.

After identifying what hardware components are affected by the hardware component experiencing a loss of performance (such as by the failure of DIMM 3), the workload control process 44 may access the job properties/assignment database 50 or query the SMC/CMC 24 during event processing and identify any critical jobs that are running on the affected hardware components. Accordingly, the job properties/assignment database 50 is a non-limiting example of the data that may be obtained for use by the workload control process 44. It should be recognized that the data may be obtained from various sources and/or databases at different times and it is not necessary that the data be arranged in a single database or in the arrangement shown.

If the workload control process 44 finds that a critical job, such as Job X, is running on an affected system or hardware component, then the workload control process 44 may make further use of the job properties/assignment database 50 to identify unaffected hardware or an unaffected system to which the critical job may be migrated. It should be recognized that any determination to migrate a critical job from affected hardware should consider that the destination system must have sufficient resources available to meet or exceed the resources required for the critical job. Furthermore, the workload control process may optionally determine whether the critical job requires any of the affected hardware, even if it is on the same system. For example, the ordering system for an online retailer would be drastically affected by a failed network card or interface, whereas an internal accounting process (even if tagged as critical) would probably not require a network card to complete the job.

In addition to migrating a critical job to unaffected hardware, the workload control process 44 may also migrate a non-critical job to the affected hardware. In this manner, the system may take advantage of the remaining capacity of the affected hardware to perform a job that needs processing. As shown in FIG. 2, Job X has been running on System 0 and requires 3 GB RAM to run. Since DIMM 3 on System 0 has failed, Job X is identified to be migrated to System 1. Furthermore, System 1 has been running Job Y, which is not critical. Here, the dashed lines 52 illustrate the migration of Job X to System 1 and Job Y to System 0.

As shown in the job properties database, each job has received a user-provided tagging to indicate whether or not the job is critical. For example, the user might be the administrator of an online retail store might tag an order processing system/job as critical and a data mining application/job as non-critical. Accordingly, the administrator used his/her knowledge of the store's business objectives to tag each job as critical or not critical. However, it should also be recognized that utilization of resources might be a proxy for criticality in the absence of something better. For example, the application that is using more of its allocated resource pool actively might be considered more critical than the application that appears to be idle at the moment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
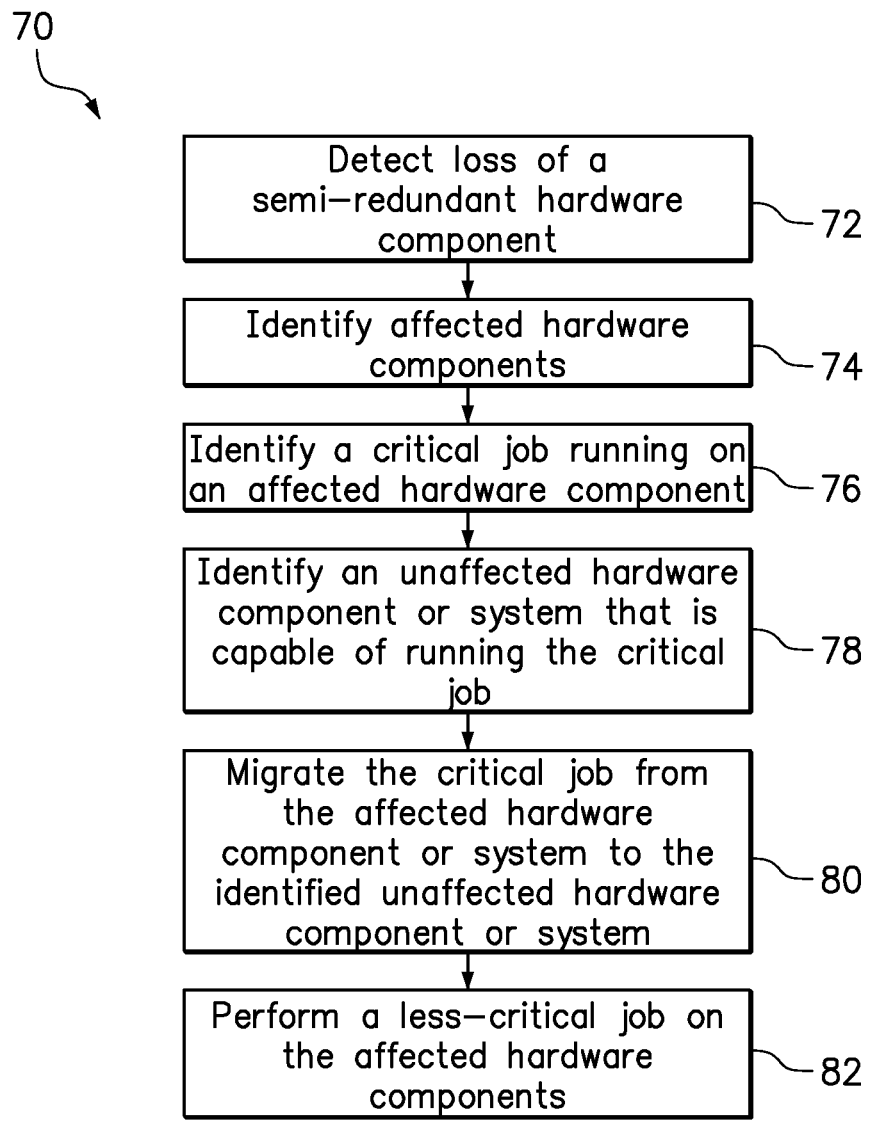
FIG. 3 is a flowchart of one embodiment of a method that may be performed by the workload management controller in accordance with the present invention.

FIG. 3 is a flowchart of one embodiment of a method 70 that may be performed by the workload management controller in accordance with the present invention. Step 72 detects loss of a semi-redundant hardware component, such as by receiving an alert from a chassis management controller. In step 74, affected hardware components, whose performance may be affected by the loss of the semi-redundant hardware component, are identified. Step 76 identifies a critical job running on an affected hardware component and step 78 identifies an unaffected hardware component or system that is capable of running the critical job. Then, in step 80, the critical job is migrated from the affected hardware component or system to the identified unaffected hardware component or system. One or more less-critical jobs may be performed on the affected hardware components, according to step 82.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    detecting loss or degradation of the level of operation of one or more of the semi-redundant hardware components;
    identifying hardware components that are affected by the loss or degradation of the one or more semi-redundant components;
    migrating a critical job from an affected hardware component to an unaffected hardware component;
    performing less-critical jobs on an affected hardware component; and
    migrating a less-critical job from the unaffected semi-redundant hardware component to the affected hardware component.

2. The method of claim 1, wherein the loss of a semi-redundant component reduces the capacity of affected hardware components in the computer system without entirely disabling the computer system.

3. The method of claim 2, wherein the semi-redundant hardware component is selected from memory modules, CPU cores, ethernet ports, power supplies, fans, disk drives, and other IO connections.

4. The method of claim 2, wherein the semi-redundant hardware component is a power supply tied into a power bus with one or more other power supplies, wherein the power bus provides power to the computer system.

5. The method of claim 1, further comprising:
deconfiguring a specific semi-redundant hardware component from systems utilizing the specific semi-redundant hardware component in response to detecting loss of the specific semi-redundant hardware component.

6. The method of claim 1, further comprising:
storing a user-provided tag in association with a job, wherein the tag may be set to identify the job as critical.

7. The method of claim 1, further comprising:
identifying a job as being critical in response to determining that the job is currently using greater than a setpoint percentage of resources allocated to the job.

8. The method of claim 1, further comprising:
maintaining a job list identifying critical jobs, wherein the step of migrating a critical job includes selecting the critical job from the job list.

9. The method of claim 1, further comprising:
obtaining a job list of the jobs running on affected hardware components; and
using the job list to identify the critical job to migrate.

10. The method of claim 9, wherein the step of obtaining the job list includes querying the affected hardware components.

11. The method of claim 9, wherein the step of obtaining the job list includes reading a workload database maintained by a workload management controller.

12. The method of claim 9, wherein the step of identifying hardware components that are affected by the loss or degradation of the one or more semi-redundant components, includes querying a plurality of hardware components within a common system with the one or more semi-redundant components.

13. The method of claim 9, wherein the step of identifying hardware components that are affected by the loss or degradation of the one or more semi-redundant components, includes reading an inventory of hardware components within a common system with the one or more semi-redundant components.

14. The method of claim 1, further comprising:
maintaining a list of semi-redundant hardware components in a computer system.

* * * * *